Feb. 5, 1957 G. P. SANDERSON 2,780,202
CHARTS OR INDICATORS
Filed May 4, 1954 4 Sheets-Sheet 1
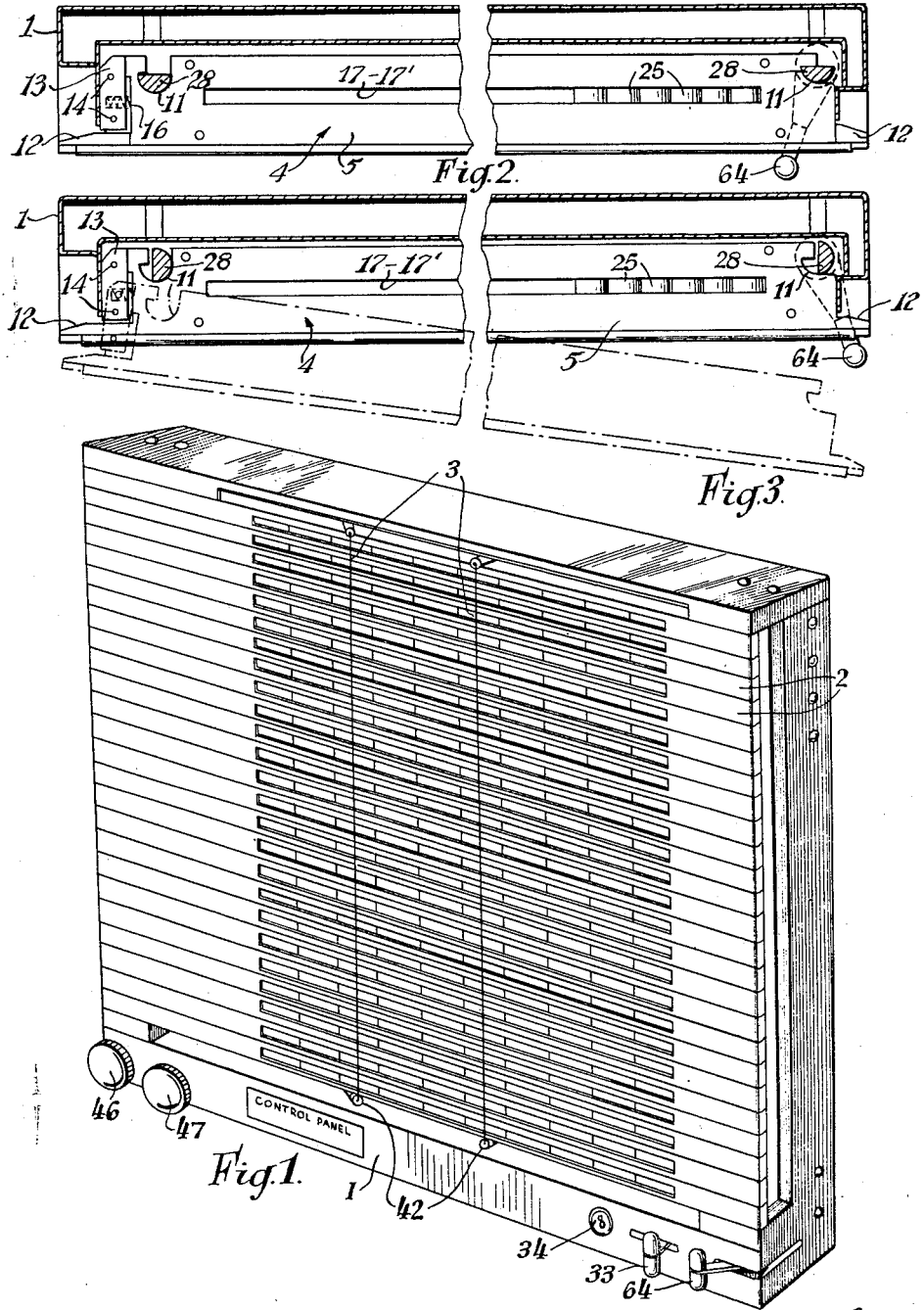

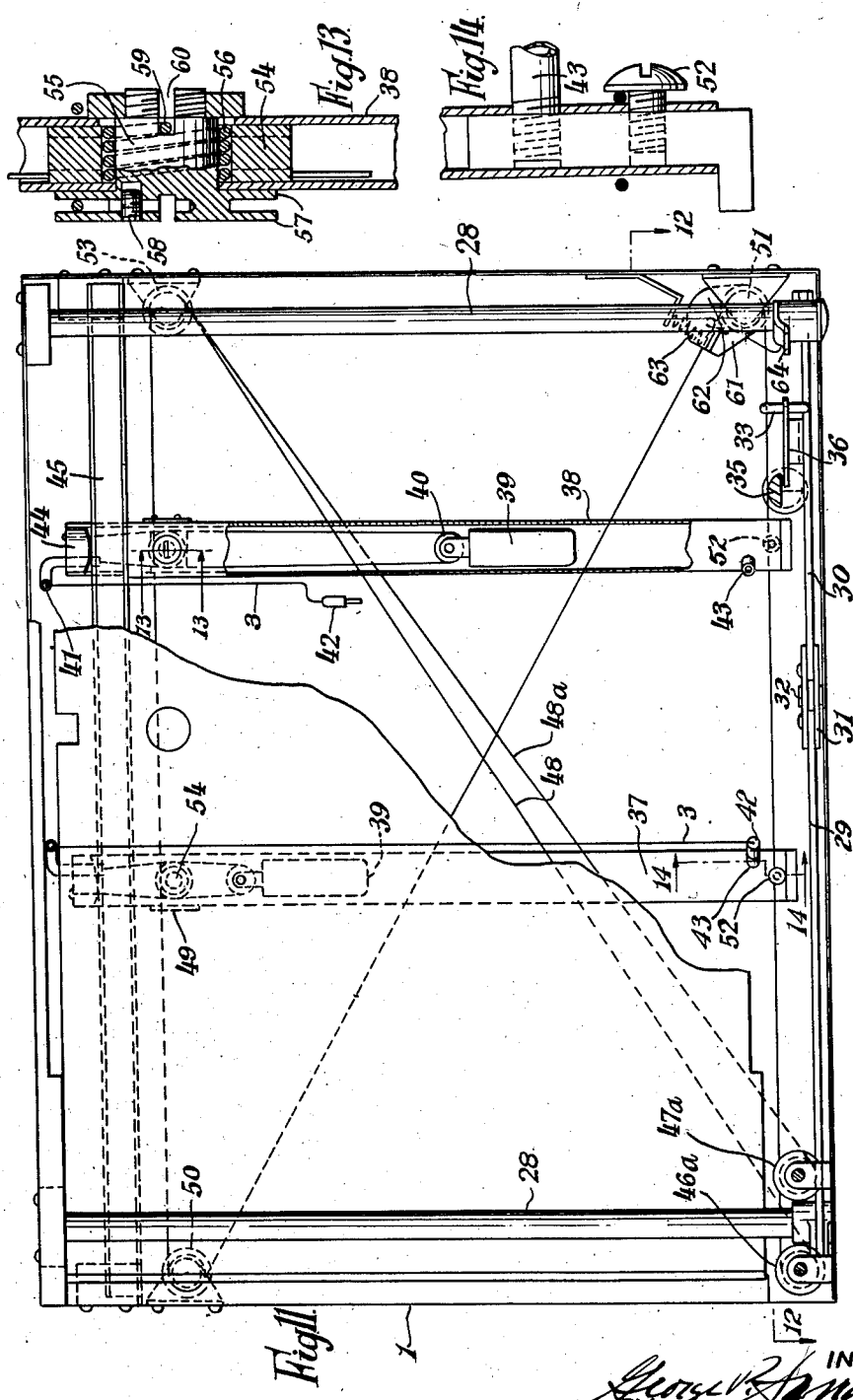

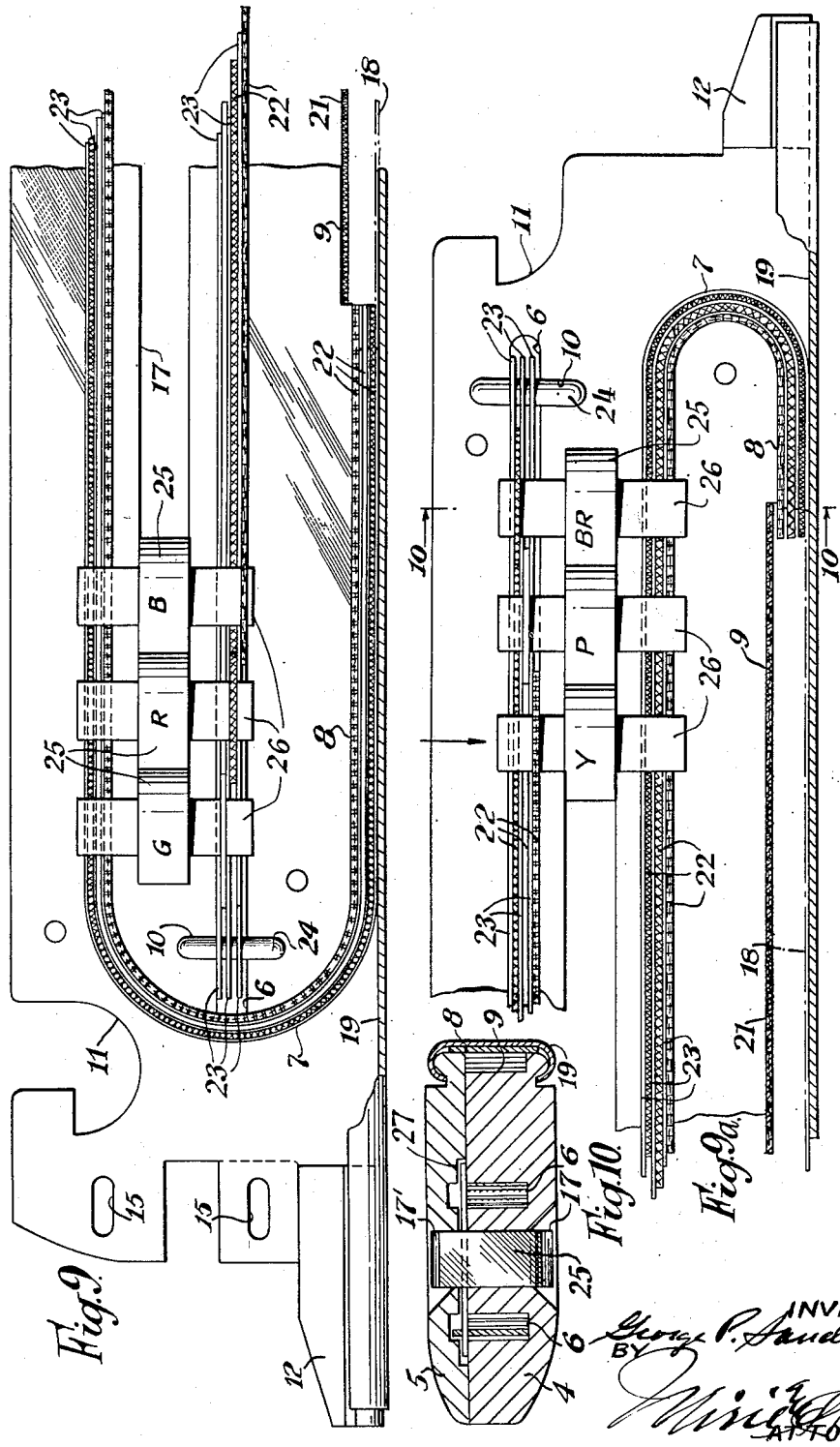

Feb. 5, 1957 G. P. SANDERSON 2,780,202
CHARTS OR INDICATORS
Filed May 4, 1954 4 Sheets-Sheet 4
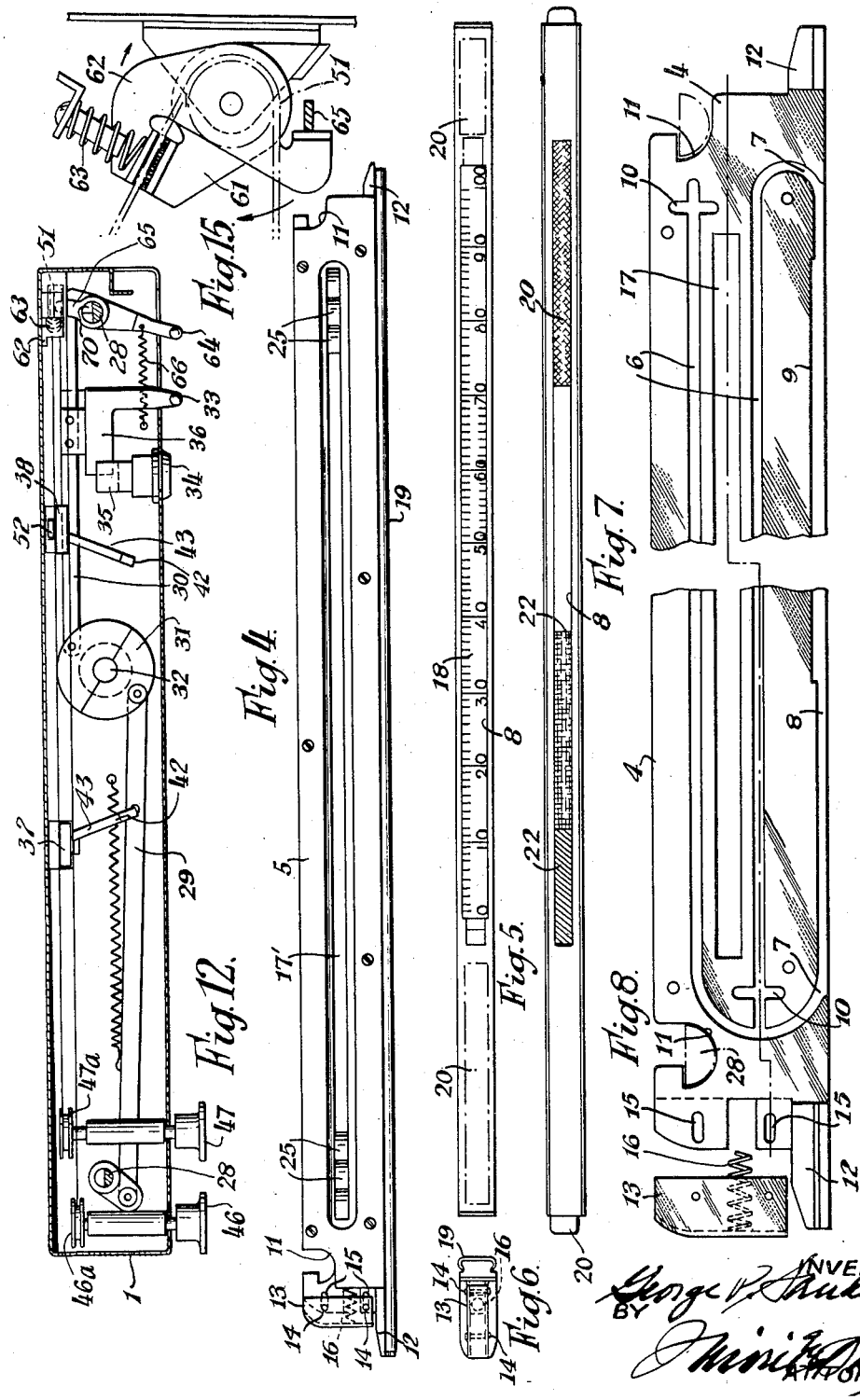

United States Patent Office
2,780,202
Patented Feb. 5, 1957

2,780,202

CHARTS OR INDICATORS

George Percival Sanderson, Hove, England

Application May 4, 1954, Serial No. 427,492

Claims priority, application Great Britain December 4, 1953

10 Claims. (Cl. 116—135)

This invention relates to charts or indicators of the kind generally known as bar charts which include a plurality of tapes or ribbons of contrasting colours which are individually slidable relative to a fixed scale to appear to an observer as a colour band or bar divided into contrastingly coloured or contrastingly marked parts each of a significant length. Such a bar chart may be used to represent pictorially or graphically the details of output or other information relating to a commercial, industrial or other concern which details may vary from day to day. Such details may relate, for example, to daily production, sales, available material and the like which may be pictorially represented on the chart so that any situation that may arise may be instantly appreciated and the appropriate action taken.

The chief object of the invention is to evolve a chart or indicator hereinafter referred to as a bar chart of a generally improved construction, a further object being to evolve a bar chart which can be built up to any required capacity by constructing it in the form of a plurality of identical individual units which can be removed from a suitable containing housing or the like both individually and in an interchangeable manner. It is preferred in this connection that to prevent any unauthorised operation of the chart it shall be necessary to remove a unit from its associated housing before the chart can be reset, suitable means being provided for locking the units in position so as to prevent their unauthorised removal.

A bar chart unit in accordance with the present invention includes a casing formed with one or more grooves or slots containing ribbon-like strips of contrastingly coloured or contrastingly marked material which strips are normally accommodated or substantially accommodated within said slot or slots where they are hidden from the view of an observer, but are capable of projection therefrom individually to a greater or less extent by associated hand actuated sliders, the strips when projected or partially projected being observable at the front of the casing and appearing as a ribbon or bar built up of contrastingly coloured or contrastingly marked sections each of a determined length, the ribbon or bar lying in juxtaposition to a fixed scale associated with the front of the casing.

Although it is within the scope of the invention to employ, for example, two such ribbon-like strips it will generally be desirable to employ a greater number, for example, six, each ribbon being controlled by its own associated slider.

Although it is within the scope of the invention to provide a groove for each strip the grooves converging to a common exit mouth, it is preferred to use a minimum number of grooves, for example, two running lengthwise of the casing in parallel relationship, the ends of the groove nearest the ends of the casing being curved towards the front of the casing where they provide two exit mouths at or near the opposite ends of the casing from each of which a strip or group of strips can be projected into a position in which they lie in front of the casing adjacent a fixed scale and consequently can be observed. In such a case assuming six strips are used, three will be accommodated in each groove in superimposed relationship, the width of each groove being just sufficient to accommodate and laterally support three strips with intervening fixed partition strips, the latter serving to separate the sliding strips and prevent movement being accidentally communicated from one strip to another during the process of adjustment.

Referring to the drawings:

Figure 1 is a perspective view of the complete bar chart:

Figures 2 and 3 are horizontal sections showing the bar unit locking mechanism in its operative and inoperative positions respectively:

Figures 4, 5 and 6 are plan, front and end elevations respectively of one of the bar units:

Figure 7 is a front elevation of a bar unit with the scale removed:

Figure 8 is a fragmentary plan view of the moulded casing and a bar unit, the cover and internal components having been removed:

Figures 9 and 9a are fragmentary plan views of the left and right hand ends of a bar unit, the cover having been removed to show the internal mechanism:

Figure 10 is a transverse section on the line 10—10 in Figure 9a with the cover in position:

Figure 11 is a fragmentary front elevation of the housing:

Figure 12 is a sectional plan view on the line 12—12 in Figure 11:

Figure 13 is a fragmentary section on an enlarged scale on the line 13—13 in Figure 11:

Figure 14 is a fragmentary sectional view on the line 14—14 in Figure 11:

Figure 15 is a fragmentary plan view on an enlarged scale of the cursor locking mechanism.

The general arrangement of the bar chart will be seen clearly from Figure 1, the bar chart comprising a housing 1 composed of metal or other suitable material, the housing containing a plurality of bar chart units 2, in this case twenty-five, the units being arranged in superimposed relationship but being removable individually from the housing for the purpose of adjustment. The housing includes means whereby all the units can be locked in the housing, thus preventing unauthorised removal and tampering with the strip actuating sliders. The housing is provided with two cursors 3 (Figs. 1 and 11) which lie in front of the units and which are movable out of the way when it is desired to remove one or more units from the housing. An important feature of the invention is that all the units are frictionally held in position in the housing even when the locking mechanism is in its inoperative position and consequently one or more units can easily be removed without displacing the remaining units from their original positions.

The construction of the unit itself will now be described and it is proposed to produce the casing of each unit and also its associated cover and one or more associated parts from mouldings, it being preferred to employ a synthetic resin composition, such as for example, a synthetic resin of the phenolic group, this particular group being chosen by virtue of such a moulding having maximum dimensional stability and freedom from plastic deformation in the course of its life.

The casing is indicated generally by reference numeral 4 and it will be seen that it is comparatively long in relation to its width, but is comparatively thin, so that a large number of units may be built into one housing, the upper and lower surfaces of each unit being free from projections so that the units can fit together closely one on top of each other.

Each casing 4 is closed on its upper surface by means of a cover plate 5 which is preferably secured in position thereon by means of self-tapping screws.

The casing is formed with two parallel grooves 6 (Fig. 8) each groove being curved towards its exit mouth 7 at the front of the casing, the two exit mouths merging into a third groove 8 on the front of the casing which is formed with a recess 9 for a purpose hereinafter referred to. The grooves 6 merge at their opposite ends into transverse grooves 10. Each casing is provided with an arcuate recess 11 at each end to co-operate with a half round section locking bar 28 which will be described in detail later on in the specification and which is associated with the housing.

The opposite ends of the casing 4 are provided with extensions 12 forming convenient finger grips when inserting the unit into the housing. One end of the casing carries a channel shaped gripper shoe 13 which is riveted to the end of the casing, the rivets 14 passing through slots 15 in the casing so that the gripper shoe has a limited linear movement lengthwise of the casing, the gripper shoe being urged outwardly by means of an associated coil spring 16. The gripper shoe is intended in a manner hereinafter referred to, to frictionally engage the interior of the housing 1 and thus maintain its associated unit firmly in position even though the locking mechanism is in its inoperative position.

The general arrangement of the unit is clearly shown in Figures 4, 5, 6 and 7 and as will be seen from these Figures the casing 4 is formed with a longitudinally arranged slot 17, the cover 5 being likewise formed with a corresponding slot 17', best shown in Fig. 10, the two slots co-operating together to provide a common runway for a plurality of sliders which serve to actuate the various coloured or otherwise marked strips.

Each casing 4 and its associated cover carries along its front face a suitable scale 18 which is marked on a suitable transparent plastic strip material, the casing carrying also a transparent cover strip 19 which extends substantially the full length of the casing, the edges of the cover strip being curved inwardly as shown clearly in Figures 6 and 10 to enter grooves formed in the upper face of the cover and lower face of the casing, the cover strip being slid lengthwise of the casing into its operative position. The cover strip serves to maintain in position suitable legend cards 20 (see Figure 5).

Referring now particularly to Figures 9, 9a and 10 which illustrate in detail the internal arrangement of the parts of each bar unit, it will be seen that in the proposed arrangement six suitably coloured sliding strips are provided the strips being coloured, for example, red, green, white, brown, pink and yellow. An additional fixed strip 21 is located in the recess 9 hereinbefore referred to in the description of Figure 8. This strip 21 preferably coloured blue, presents a permanent background as seen through the transparent window formed by the scale and its associated transparent cover strip.

The sliding coloured strips are indicated generally by reference numeral 22, the sliding strips being maintained out of contact with one another by intervening fixed partition strips indicated by reference numeral 23, there being six partition strips in all. The lengths of the partition strips are such that they do not encroach on the window space at the front of the unit, but merely serve to separate the sliding strips and prevent accidental movement of one strip when an adjacent strip is being adjusted. The partition strips are located in position by means of pegs 24 inserted in the transverse slots 10 hereinbefore referred to.

Each sliding strip is movable under the control of an associated finger actuated slider, the sliders being generally indicated by reference numeral 25. As will be seen clearly from Figure 10, these sliders fit accurately in the co-operating slots 17, 17' formed in the casing and cover. To facilitate finger operation the walls of the two slots are inclined or countersunk, whilst the upper and lower surfaces of the sliders lie slightly below the upper surface of the cover 5 and above the lower surface of the casing 4 so that there is no liability for the position of the sliders to be altered as a result of insertion or removal of a unit from the housing 1. Each slider 25 is in the form of a moulding and includes a moulded-in sheet metal insert 26 which passes through a slot formed in the sliding strip which it is intended to actuate. The cover is recessed as at 27 (see Figure 10) to clear the inserts 26 and permit of longitudinal travel of the sliders along the slot in which they are mounted.

By providing three sliders 25 which when none of the sliding strips are visible in the window space are situated three at one end of the slot and three at the opposite end of the slot as in Figures 9 and 9a, the sliders are virtually interlocking. This ensures that neither any one nor more of the three sliding strips advancing into the scale area from one end can override or in any way conflict with those fed from the other end and that in each set of three sliding strips (i. e. those fed from the right and those fed from the left respectively), those behind can always extend beyond those in front, but those in front can never extend beyond the ones behind. For example, if it is desired to advance the brown sliding strip in the scale area without the pink and yellow strips coming into use this is quite readily accomplished by moving the brown slider. In this connection it is proposed for the purpose of easy adjustment to use coloured resin materials or otherwise colour the sliders, the arrangement being such that the blue slider will operate the red strip, the red slider the green strip, the green slider the white strip, the yellow slider the yellow strip, the pink slider the pink strip and the brown slider the brown strip. Owing to the interlocking feature, and since the brown strip in the example illustrated lies in front of pink and yellow in the same set, as brown is advanced pink and yellow will automatically be carried forward behind it with the result that although pink and yellow have not made any appearance nor been consciously moved by the operator, they have in fact, taken up a position behind the leading edge of brown so that they are ready to put in an appearance in their correct position at any time required. To more clearly illustrate the point the colours of the sliders shown in Figures 9 and 9a have been marked on the drawing by the initial letter.

Referring now to Figures 2 and 3 of the drawings, these two figures illustrate clearly the manner in which the various units are secured in position within their associated housing. It will be seen that the units are maintained frictionally in position within the housing by the action of the spring urged gripper shoe 13 which engages the inner surface of the housing, the arrangement being such that when the locking bars 28 which are of half round section are in the position shown in Figure 2, they will engage the edges of the cut-away parts 11 of the units and thus prevent withdrawal of the units in a forward direction. When, however, the two locking bars 28 are moved into the position shown in Figure 3 any one of the units can be withdrawn forwardly as indicated by dotted lines.

The two locking bars 28, as shown in Figs. 11 and 12, are mounted for part rotational movement in bearings in the top and bottom of the housing, the locking bars being connected by means of coupling bars 29 and 30 with a turret 31 which is mounted for part rotational movement about its centre 32. The locking bars are not connected directly with the coupling bars, but are provided with cranks so that endwise movement of the coupling bars will impart the required angular movement to the locking bars to move them into or out of their locked position.

Rotational movement of the locking bars 28 is under the control of a finger actuated sliding lever 33 which is riveted to the coupling bar 30. Movement of the lever 33 is under the control of a master lock 34 preferably of the plug and cylinder type, the plug being provided with a part circular extension 35 which co-operates with a lateral projection on the lever 36. In Figure 11 which shows the lock in a position in which the lever 33 can be moved to the left to rotate the locking bars into their unlocked position, the part 35 is in a position in which it will not impede movement of the part 36, but when the part 35 is moved into the dotted line position movement of the part 36 to the left will be effectively prevented, the locking bars being thus maintained in their locked position and preventing removal of the units.

The housing is provided with two cursors 3 which are arranged vertically over the front of the housing. The cursors are displaceable for the purpose of enabling the units to be removed when required. The position of each cursor is adjustable and means is provided for locking the cursors in their adjusted positions. The two cursors are associated with tubular cursor columns 37 and 38 in each of which is mounted a sliding balance weight 39, the nylon or other cursor thread being anchored at one end to the upper end of the column thence passing downwardly over a pulley 40 associated with the weight and thence upwardly through a tube 41, the end of the cursor thread terminating in a plug 42 which can be plugged into a tubular socket 43, the balance weight maintaining the cursor thread in a taut condition.

Each column 37 and 38 carries at its upper end a cursor skid 44 which slides on a fixed gantry 45 mounted in the housing, the arrangement being such that both columns can be moved laterally lengthwise of the housing into any desired position. Movement of each individual column and its associated cursor is brought about by rotational movement of finger actuated knobs 46 and 47 on the front of the housing, these knobs being mounted on spindles revolvably mounted in suitable bearings, each spindle carrying at its opposite end an associated fixed pulley 46a and 47a over which the cursor driving bands 48 and 48a pass. These driving bands are in the form of nylon or other suitable cord. The cord for operating the left-hand column is secured to the column as at 49, the cord then passing to the left over a pulley 50, thence diagonally of the housing over pulley 51, thence to its associated column where it is anchored thereto by means of a securing screw 52 (Fig. 14), the cord then passing once around pulley 46a diagonally across the housing to pulley 53 and thence to a cord tensioner 54 which is illustrated in detail in Figure 13. The right-hand column is similarly operated by its associated cord, whereby the columns may be moved individually under the control of their respective operating knobs 46 and 47.

The construction of the tensioner is clearly shown in Figure 13. The tensioner includes a tensioner body 54 which is mounted in the column, the tensioner body being bored to receive the barrel 55 of a tensioner drum and a surrounding helical spring 56. The cord is passed between the flanges 57 of the tensioner drum, these flanges being displaceable into gripping engagement with the cord under the tightening action of a set screw 58. The spring acts in a somewhat similar manner to a one-way clutch. One end of the spring 59 is turned inwardly across the spring centre and fits into a slot 60 in the drum. The inside of the diameter of the spring is over size on the drum barrel and the outside diameter is over size in the bore in the tensioner body. Thus the spring will follow movement of the drum if the drum is turned in the direction of the convolutions of the spring, but turning movement will be prevented in the opposite direction. In this way any slackness in the cord will be effectively taken up each cord being thus maintained at a uniform tension.

In Figure 15 is shown a device which serves to grip the two cords and prevent displacement of the cords and consequential movement of the columns lengthwise of the housing. This cord gripping device is associated with pulley 51 and takes the form of a fixed jaw 61 and a moving jaw 62, jaw 62 being urged towards the jaw 61, thus serving to grip the two cords between the two jaws, by means of an associated coil spring 63. The moving jaw 62 is movable angularly about the centre of the pulley 51 under the control of a finger actuated lever 64 which projects from the front of the housing. This lever which turns about the centre of its associated locking bar 28 is provided with a rearwardly directed extension 65 which engages the jaw 62. Thus movement of lever 64 towards the right will displace jaw 62 out of gripping engagement with the cords and will permit of adjustment of the two cursors. In order to prevent the cords being unlocked by means of the lever 64 when lever 33 is in its locked position, lever 64 is formed with a hole or boring 70 through which the locking bar 28 passes, the boring being not fully circular but merely a three quarter circle. It will be appreciated, therefore, that when the locking bar is in its unlocking position, lever 64 can be moved to the right against the action of coil spring 66, but when the locking bar 28 is in its alternative position angular movement of lever 64 will be prevented. In this way displacement of either cursor cannot take place when the housing is locked against removal of the individual units.

It will be appreciated that tubes 43 which serve to receive the plugs 42 on the ends of the cursor threads are carried by the columns 37 and 38 and consequently if the screws 52 are slackened slightly each column 38 can be moved angularly about the point of contact between the cursor skid 44 and the gantry 45. In this way an adjustment is provided to enable each cursor thread to be moved into a truly vertical position, the screws being then retightened to once more grip the cursor driving bands.

I claim:

1. A bar chart comprising a housing open at the front, a plurality of bar chart units in superimposed relationship within said housing, said units being individually removable and interchangeable, means for locking said units to said housing against unauthorized removal, each unit comprising a casing provided with a plurality of slots, ribbon-like strips of contrasting colors normally positioned in said slots and normally hidden from an observer's view, hand actuated sliders for projecting individually said strips from their corresponding slots for observation at the front of the casing, fixed strips in the casing for dividing each slot into a series of individual compartments each containing a sliding strip, said fixed strips being interposed between adjacent sliding strips for packing each slot to prevent backlash in each strip and transmission of sliding movement of one strip to an adjacent strip, each ribbon-like strip being fixed at its inner end to a hand actuated slider and all sliders being mounted for longitudinal sliding movement in a common slot formed in the casing and situated at the rear of the casing so that they are accessible only when their associated unit is removed from the housing, and a fixed scale associated with the front of the casing in juxtaposition with the ribbon-like strips.

2. A bar chart unit as set forth in claim 1, including a colored fixed strip on the front of the casing over which the sliding strips move, said colored strip forming a part of the colored indicating means of the slidable ribbon-like strips.

3. A bar chart as set forth in claim 1, including a gripper shoe associated with one end of said unit, and resilient means urging said gripper shoe to frictionally engage a part of the housing but permitting removal and replacement of said unit from said housing.

4. A bar chart apparatus as set forth in claim 1, including a plurality of cursors, and means for adjustably mounting said cursors for cooperation with the bar chart units.

5. A bar chart apparatus as set forth in claim 4, wherein the means for adjustably mounting the cursors are linearly movable over the front of the housing and are displaceable for removal of the units from the housing.

6. A bar chart apparatus as set forth in claim 5, including additional locking means operating in conjunction with the units locking means for locking the cursors against unauthorized displacement.

7. A bar chart unit comprising a casing provided with a plurality of slots, ribon-like strips of contrasting colors normally positioned in said slots and normally hidden from an observer's view, hand actuated sliders for projecting individually said strips from their corresponding slots for observation at the front of the casing, fixed strips in the casing for dividing each slot into a series of individual compartments each containing a sliding strip, each ribbon-like strip being fixed at its inner end to a hand actuated slider and all sliders being mounted for longitudinal sliding movement in a common slot formed in the casing, and a fixed scale associated with the front of the casing in juxtaposition with the ribbon-like strips, said sliders are arranged in two groups, one group situated at one end of the common slot and another group at the opposite end of the common slot so that said sliders are virtually interlocked, whereby no one of the sliding ribbon-like strips advancing into the scale area from one end of the casing can override or be in conflict with any one of the sliding ribbon-like strips advancing from the other end of the casing.

8. A bar chart comprising a housing open at the front, a plurality of bar chart units in superimposed relationship within said housing, said units being individually removable and interchangeable, means for locking said units to said housing against unauthorized removal, each unit comprising a casing provided with a window in the front thereof and a plurality of slots in communication with said window, ribbon-like strips of contrasting colors positioned in said slots normally beyond said window and hidden from an observer's view, a hand actuated slider connected with one end of each strip for projecting its associated strip from its containing slot into said window for observation at the front of the housing, fixed strips in each slot interposed between adjacent sliding strips for packing each slot to prevent backlash in each strip and transmission of sliding movement of one strip to an adjacent strip, all sliders being situated at the rear of the casing so that they are only accessible when their associated unit is removed from the housing, said sliders being mounted for longitudinal sliding movement in a common slot in their associated casing, and a fixed scale on the front of each casing in juxtaposition with said window and the associated ribbon-like strips exposed in said window.

9. A bar chart comprising a housing open at the front, a plurality of bar chart units in superimposed relationship within said housing, said units being individually removable and interchangeable, means for locking said units to said housing against unauthorized removal, each unit comprising a casing provided with a plurality of slots, ribbon-like strips of contrasting colors positioned in said slots and hidden from an observer's view, a hand actuated slider connected with one end of each strip for projecting its associated strip from its containing slot for observation at the front of the housing, said sliders being mounted for longitudinal sliding movement in a common slot in their associated casing, fixed strips in each slot interposed between adjacent sliding strips, said fixed strips and sliding strips packing each slot to prevent backlash in each strip, all sliders being situated at the rear of the casing so that they are only accessible when their associated unit is removed from the housing.

10. A bar chart comprising a housing open at the front, a plurality of bar chart units in superimposed relationship within said housing, said units being individually removable and interchangeable, each unit comprising a casing provided with a plurality of slots, ribbon-like strips of contrasting colors positioned in said slots and hidden from an observer's view, a hand actuated slider connected with one end of each strip for projecting its associated strip from its containing slot for observation at the front of the housing, said sliders being mounted for longitudinal sliding movement in a common slot in their associated casing, all sliders being situated at the rear of the casing so that they are only accessible when their associated unit is removed from the housing, and means for locking said units to said housing against unauthorized removal, and comprising a vertical bar of semi-circular cross-section within the housing, a complementary recess in each of said casings, a shoulder blocking a portion of said recess, and means accessible from the front of the housing for rotating said bar into interlocking association with said recess and shoulder.

References Cited in the file of this patent

UNITED STATES PATENTS

| | | |
|---|---|---|
| 1,558,920 | Rech | Oct. 27, 1925 |
| 2,118,675 | Jackson | May 24, 1938 |
| 2,299,284 | Steidemann | Oct. 20, 1942 |
| 2,629,184 | Johnson | Feb. 24, 1953 |
| 2,629,645 | Schwerin | Feb. 24, 1953 |